United States Patent
Rice

(10) Patent No.: US 9,635,157 B2
(45) Date of Patent: Apr. 25, 2017

(54) SYSTEM AND METHOD FOR AUGMENTING A SECOND ITEM WITH A PRESENTATION OF FEATURES AT A FIRST ITEM

(71) Applicant: Boogli Inc., Panama City Beach, FL (US)

(72) Inventor: Todd Rice, Panama City Beach, FL (US)

(73) Assignee: Boogli, Inc., Panama City Beach, FL (US)

( * ) Notice: Subject to any disclaimer, the term of this patent is extended or adjusted under 35 U.S.C. 154(b) by 165 days.

(21) Appl. No.: 14/327,804

(22) Filed: Jul. 10, 2014

(65) Prior Publication Data
US 2015/0195397 A1  Jul. 9, 2015

Related U.S. Application Data

(60) Provisional application No. 61/924,531, filed on Jan. 7, 2014.

(51) Int. Cl.
| | |
|---|---|
| H04M 1/725 | (2006.01) |
| H04M 1/04 | (2006.01) |
| G10L 25/48 | (2013.01) |
| G06T 19/00 | (2011.01) |

(52) U.S. Cl.
CPC ....... *H04M 1/72527* (2013.01); *G06T 19/006* (2013.01); *G10L 25/48* (2013.01); *H04M 1/04* (2013.01)

(58) Field of Classification Search
None
See application file for complete search history.

(56) References Cited

U.S. PATENT DOCUMENTS

| | | | |
|---|---|---|---|
| 8,390,255 | B1 | 3/2013 | Fathollahi |
| 8,796,989 | B2 | 8/2014 | Lee et al. |
| 8,981,713 | B2 | 3/2015 | Lee et al. |
| 9,294,601 | B2 | 3/2016 | Hammond et al. |
| 9,306,611 | B2 | 4/2016 | Coverstone et al. |
| 2009/0072782 | A1 | 3/2009 | Randall |
| 2011/0074344 | A1 | 3/2011 | Park et al. |
| 2011/0293144 | A1* | 12/2011 | Rahardja ........ A63F 13/10 382/103 |

(Continued)

FOREIGN PATENT DOCUMENTS

WO    WO 2013/154857    10/2013

OTHER PUBLICATIONS

U.S. Appl. No. 14/694,905, filed Apr. 23, 2015.
U.S. Appl. No. 15/002,037, filed Jan. 20, 2016.

*Primary Examiner* — Jacinta M Crawford
*Assistant Examiner* — Jonathan M Cofino
(74) *Attorney, Agent, or Firm* — McCarter & English, LLP

(57) ABSTRACT

In some implementations, features of a character represented by a second item may be provided at a first item to augment the second item. In an implementation, a connection between the first item and the second item may be detected. The second item may comprise one or more physical components that represent a set of features of the character. First information associated with the character may be obtained in response to the detection of the connection. A presentation of one or more features of the character may be provided at the first item based on the first information.

19 Claims, 19 Drawing Sheets

(56) References Cited

U.S. PATENT DOCUMENTS

| | | |
|---|---|---|
| 2012/0043932 A1 | 2/2012 | Nakama |
| 2012/0077548 A1 | 3/2012 | Goldberg |
| 2013/0095725 A1* | 4/2013 | Von Mohr ............... A63H 3/48 |
| | | 446/321 |
| 2013/0122777 A1 | 5/2013 | Scheppegrell et al. |
| 2013/0143519 A1 | 6/2013 | Doezema |
| 2013/0307856 A1* | 11/2013 | Keane .................... G10L 21/10 |
| | | 345/473 |
| 2014/0021909 A1 | 1/2014 | Klawon |
| 2014/0125678 A1* | 5/2014 | Wang ................... A63F 13/005 |
| | | 345/473 |
| 2014/0172561 A1 | 6/2014 | Moon et al. |
| 2014/0375258 A1 | 12/2014 | Arkhipenkov et al. |
| 2015/0288421 A1 | 10/2015 | Nambord |

\* cited by examiner

SYSTEM AND METHOD FOR AUGMENTING A SECOND ITEM WITH A PRESENTATION OF FEATURES AT A FIRST ITEM

CROSS-REFERENCE TO RELATED APPLICATION

This application claims the benefit of U.S. Provisional Patent Application Ser. No. 61/924,531, filed on Jan. 7, 2014, entitled "CHARACTER CHARGER," which is hereby incorporated by reference herein in its entirety.

FIELD OF THE INVENTION

The invention relates to facilitating augmentation of a second item with a presentation of features at a first item. In particular, the invention relates facilitating augmentation of a second item that represents a character or other item with a presentation of features of the character or item at a first item. The invention also relates to facilitating augmentation of a second item that represents a place or an object (unrelated to functions of the second item) with a presentation of features of the object at a first item.

BACKGROUND OF THE INVENTION

The popularity and growth of smartphone and other mobile devices have increased demand for mobile accessories, such as cases, skins, headphones, microphone/speaker headsets, chargers, speakers, docking stations, card readers, or other accessories. As an example, many consumers augment their mobile devices with cases, skins, or other accessories resembling their favorite characters to express their interests in those characters. However, although these accessories may "dress-up" a mobile device, the mobile device still remains generic with respect to its accessories. These and other drawbacks exist.

SUMMARY OF THE INVENTION

Embodiments of the invention that may address these and other drawbacks relate to methods, apparatus, and/or systems for facilitating augmentation of a second item with a with a presentation of features at a first item. In one implementation, the first item may appear to be "part of" the second item and/or extend features of a character, a place, or object that is represented by the second item. In some implementations, for example, a presentation of the features of a character (that is represented by the second item) at the first item may appear to bring the character to "life." In this way, both the first and second items enhance one another, and the combination of the first and second items produces synergistic results.

In an implementation, a method may comprise: detecting a connection between a first item and a second item, wherein the second item comprises one or more physical components that represent a set of features of a character; obtaining first information associated with the character in response to the detection of the connection; and providing, based on the first information, a presentation of one or more features of the character at the first item, wherein the presentation of the one or more features of the character augments the second item.

In an implementation, a system may comprise one or more processors programmed with computer program instructions which, when executed, cause the processors to: detect a connection between a first item and a second item, wherein the second item comprises one or more physical components that represent a set of features of a character; obtain first information associated with the character in response to the detection of the connection; and provide, at the first item, based on the first information, a presentation of one or more features of the character, wherein the presentation of the one or more features of the character augments the second item.

In an implementation, a method may comprise: receiving, from a first item, a request for information related to one or more features of the character in response to a detection of a connection between the first item and the second item, wherein the second item comprises one or more physical components that represent a set of features of the character; obtaining the information related to the features of the character in response to the receipt of the request; and providing, to the first item, the information related to the features of the character to enable a presentation of the one or more features of the character at the first item, wherein the presentation of the one or more features of the character augments the second item.

In an implementation, a system may comprise one or more processors programmed with computer program instructions which, when executed, cause the processors to: receive, from a first item, a request for information related to one or more features of the character in response to a detection of a connection between the first item and the second item, wherein the second item comprises one or more physical components that represent a set of features of the character; obtain the information related to the features of the character in response to the receipt of the request; and provide, to the first item, the information related to the features of the character to enable a presentation of the one or more features of the character at the first item, wherein the presentation of the one or more features of the character augments the second item.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the implementations of the invention. It will be appreciated, however, by those having skill in the art that the implementations of the invention may be practiced without these specific details or with an equivalent arrangement. In other instances, well-known structures and devices are shown in block diagram form in order to avoid unnecessarily obscuring the implementations of the invention.

Exemplary System Description

Figure 1:
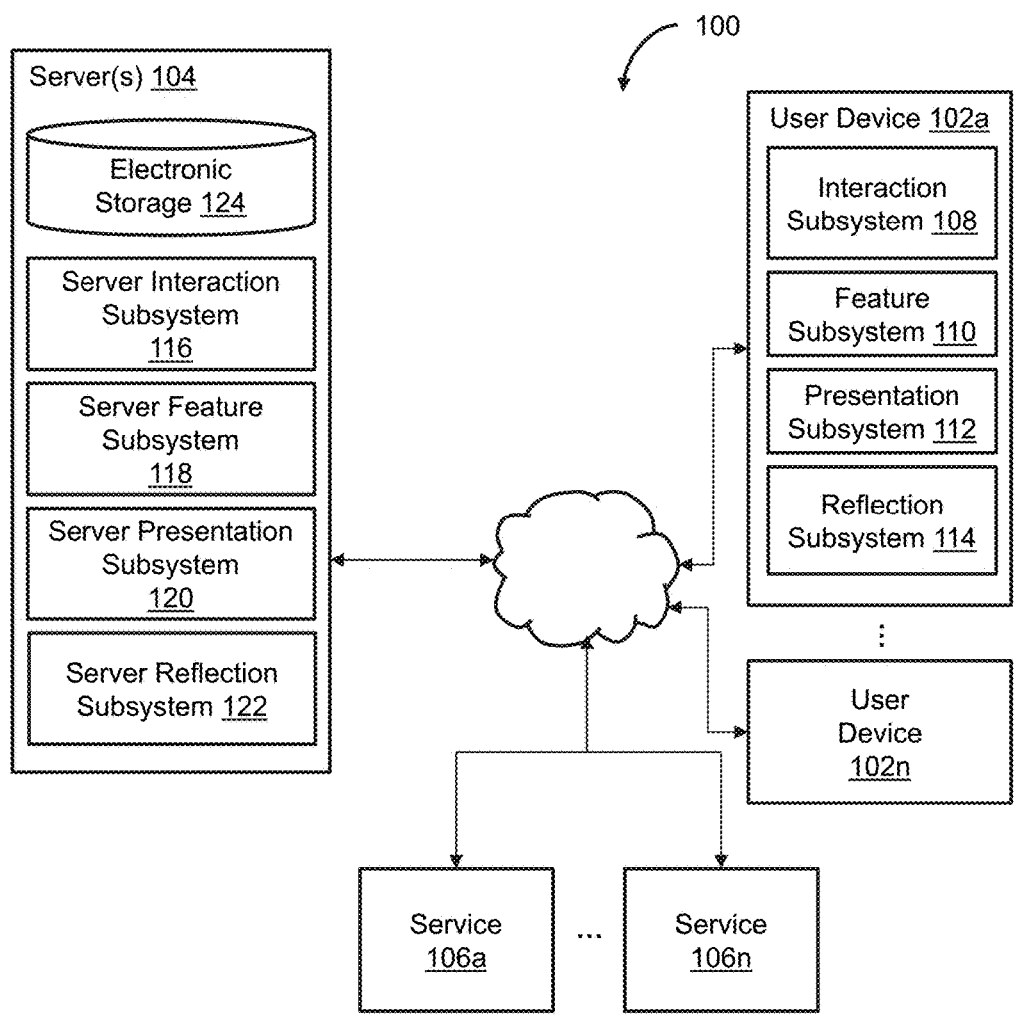
FIG. 1 is an exemplary illustration of a system for facilitating augmentation of a second item with a presentation of features at a first item, according to an aspect of the invention.

FIG. 1 is an exemplary illustration of a system 100 for facilitating augmentation of a second item with a presentation of features at a first item. Throughout this description, the term "item" may refer to any object or thing, and preferably refers to a device. In one implementation, a presentation of features of a character that is represented by a second item may be provided at a first item to augment the second item. As used herein, a character may comprise fictional or non-fictional people, animals, plants, or other characters including those possessing anthropomorphic features (e.g., a sponge character in a children's television show, a pizza character in a television show, a bad-influence cigarette character in an advertisement, etc.). In another implementation, a presentation of features of a place or an object (unrelated to functions of a second item) that is represented by the second item may be provided at a first item to augment the second item.

Figure 2A:
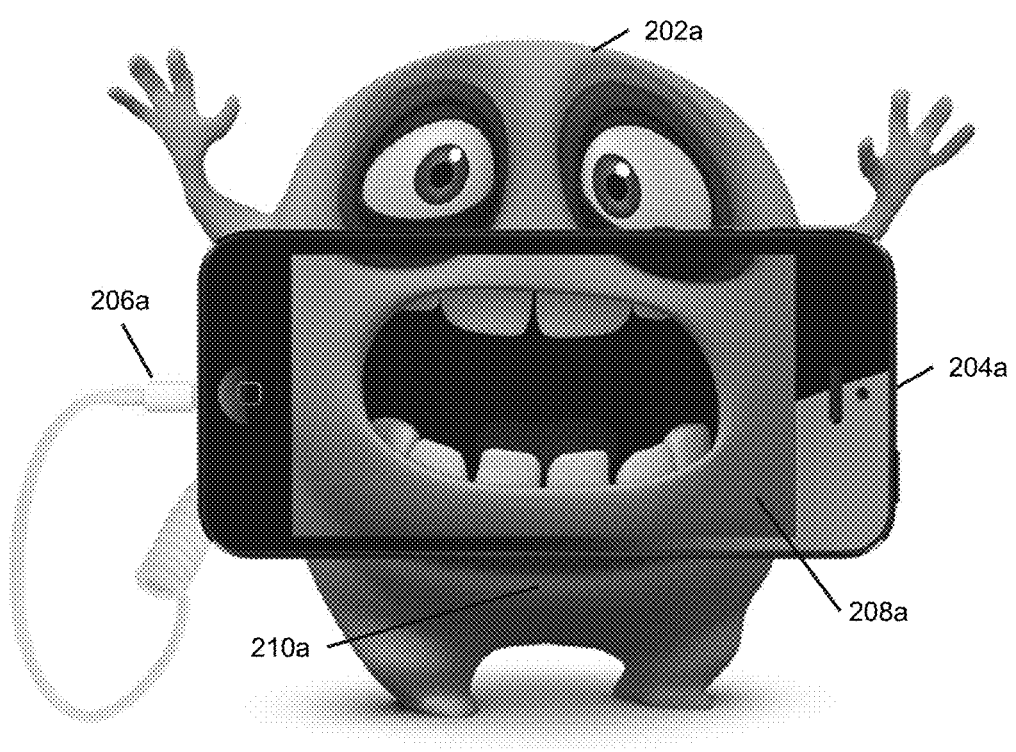
FIGS. 2A-2F are each exemplary illustrations of first and second items where a presentation of features at the first item augments the second item, according to aspects of the invention.
Figure 2B:
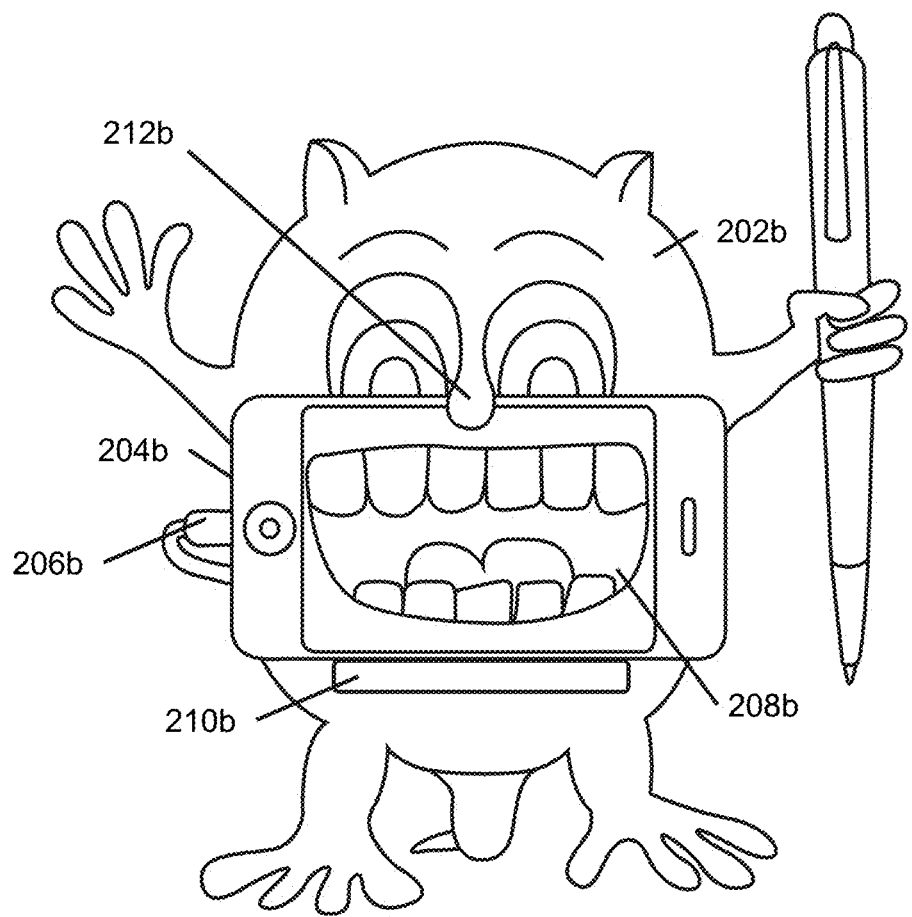
Figure 2C:
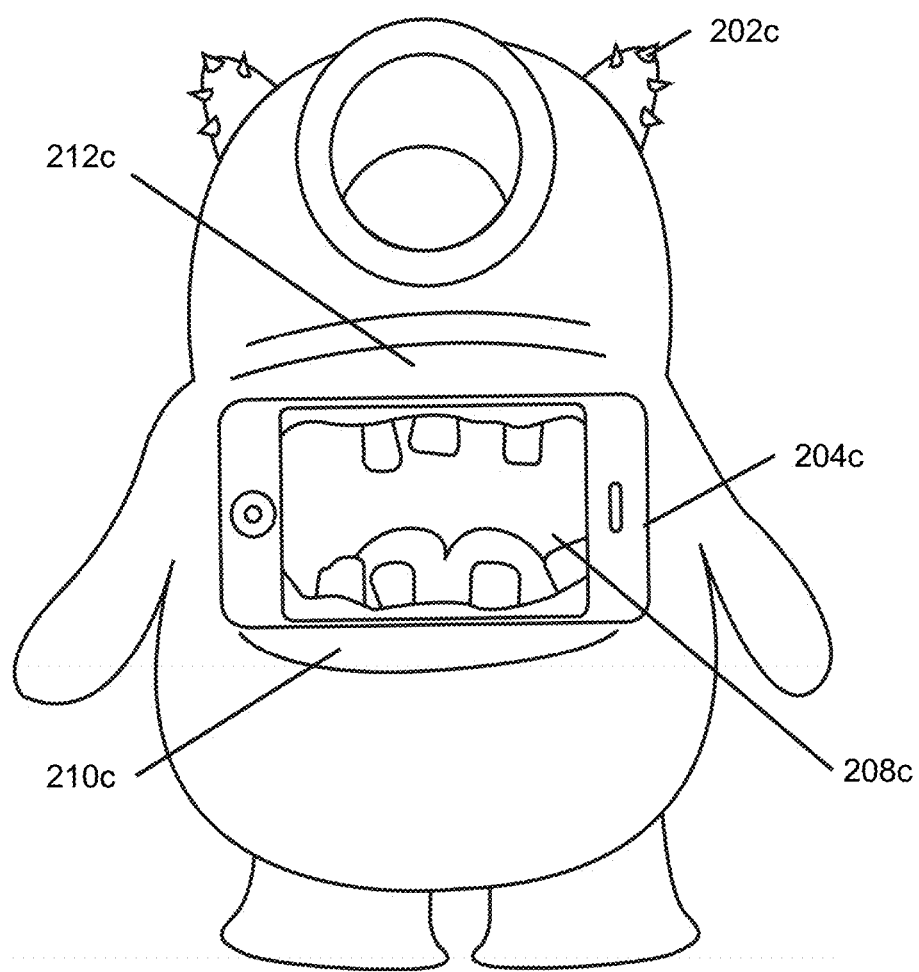
Figure 2D:
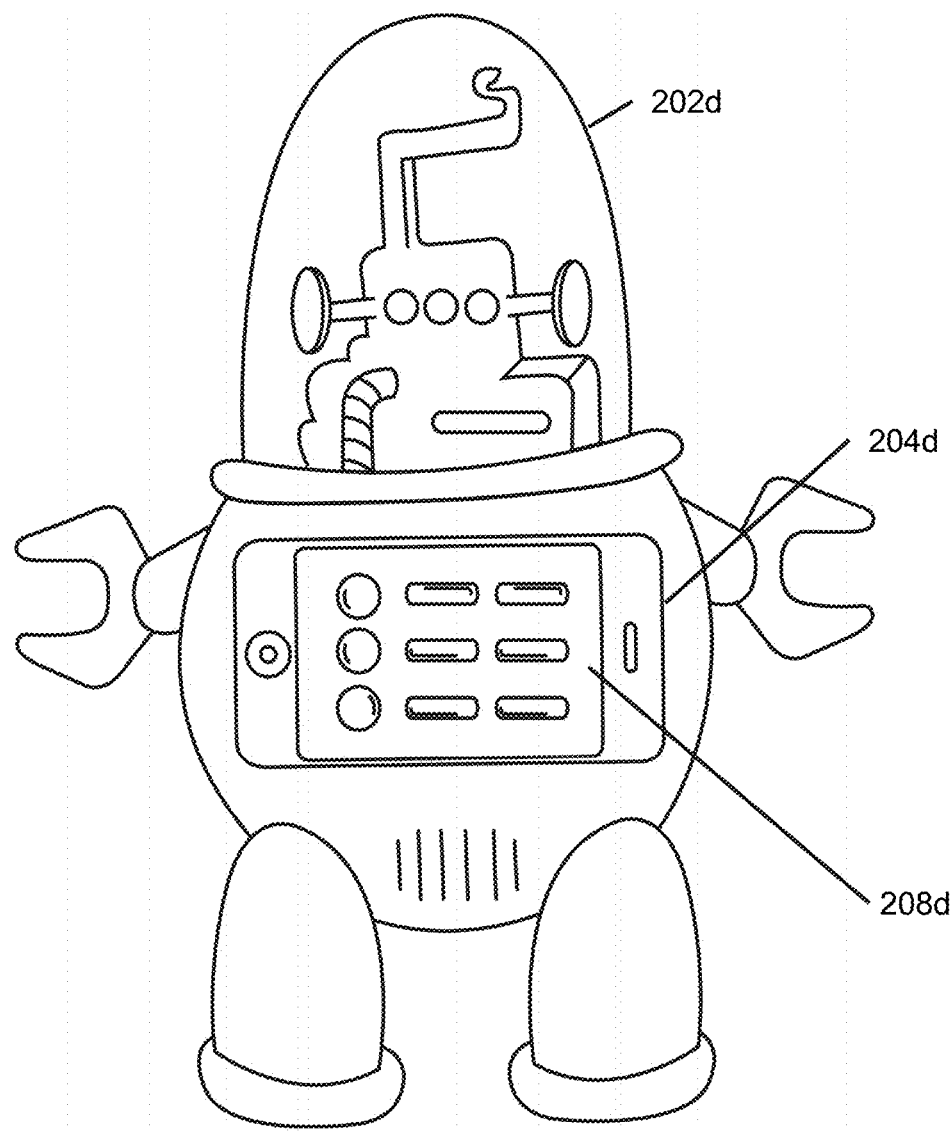
Figure 2E:
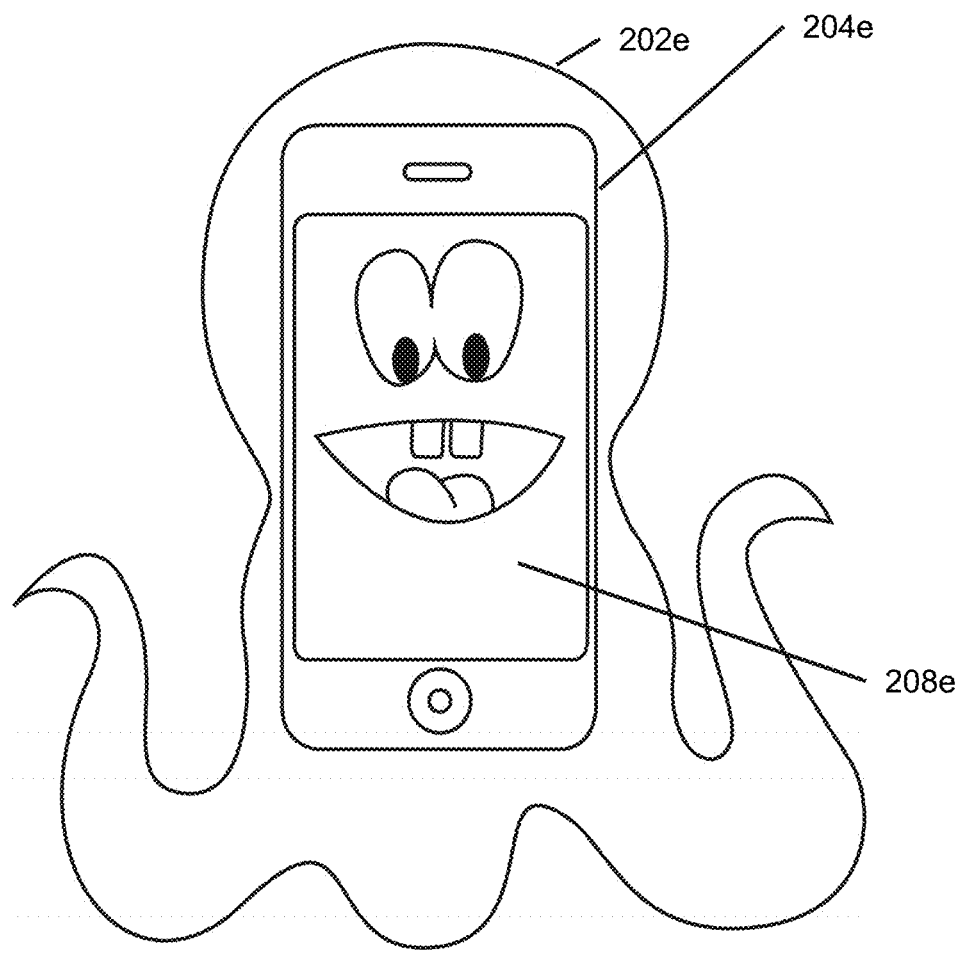
Figure 2F:
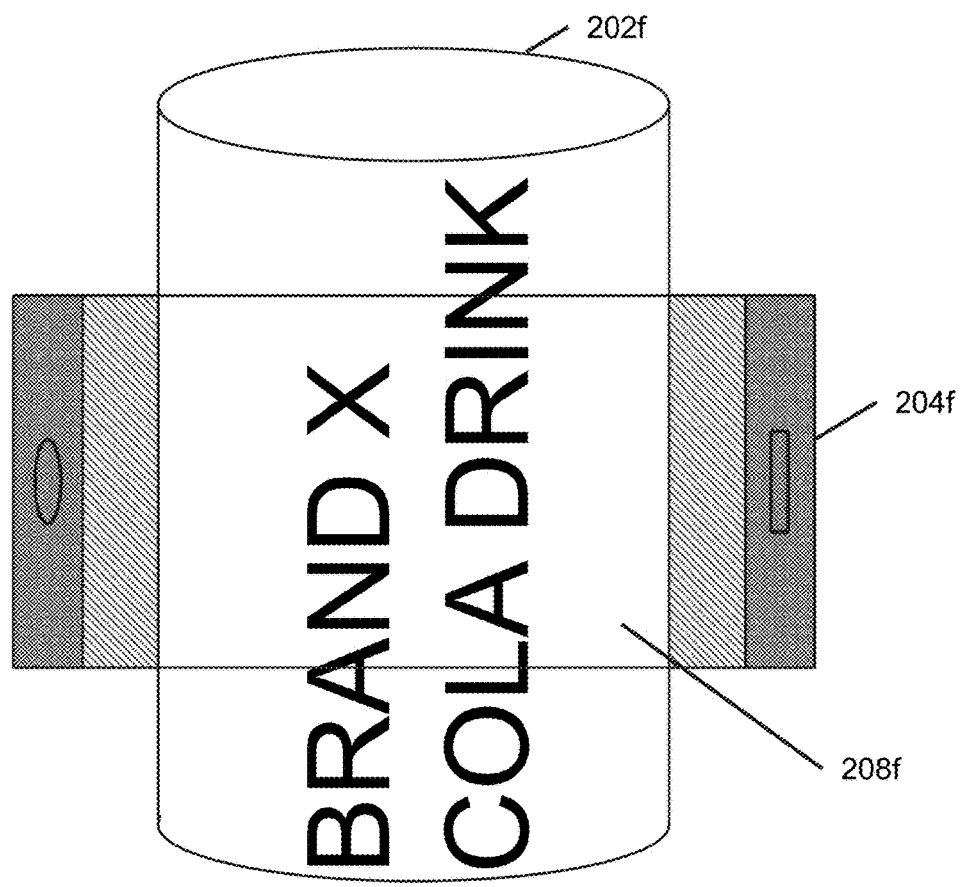
Figure 3A:
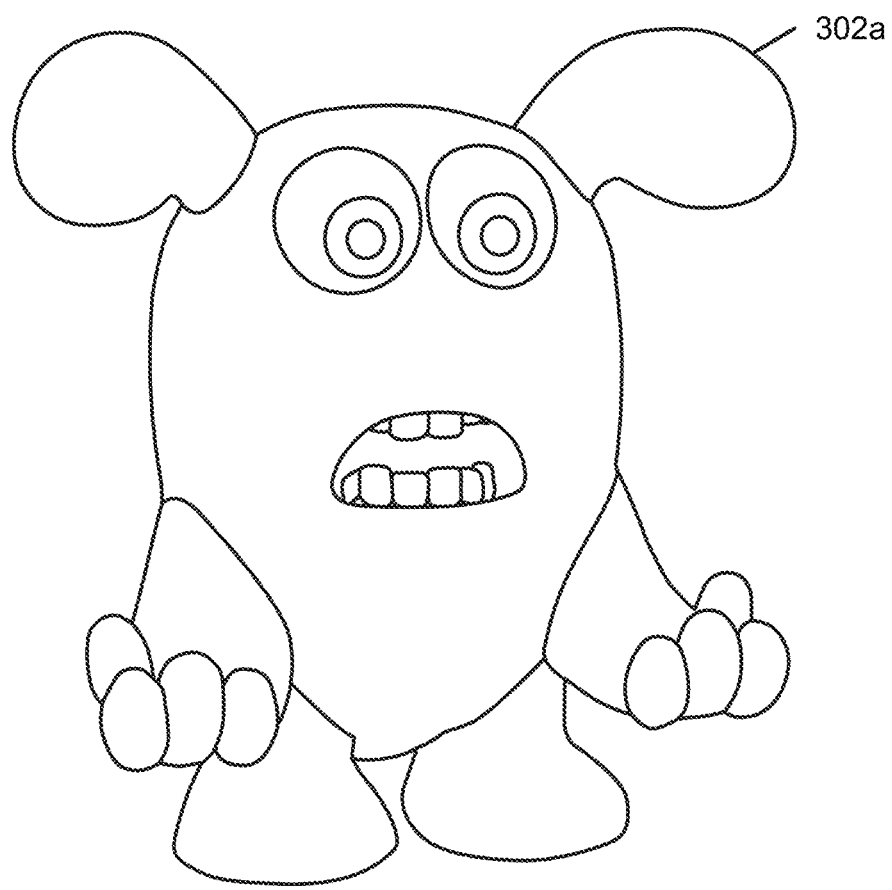
FIGS. 3A-3E are each exemplary illustrations of an item that represents a character which features are presented at another item to augment the item representing the character, according to aspects of the invention.
Figure 3B:
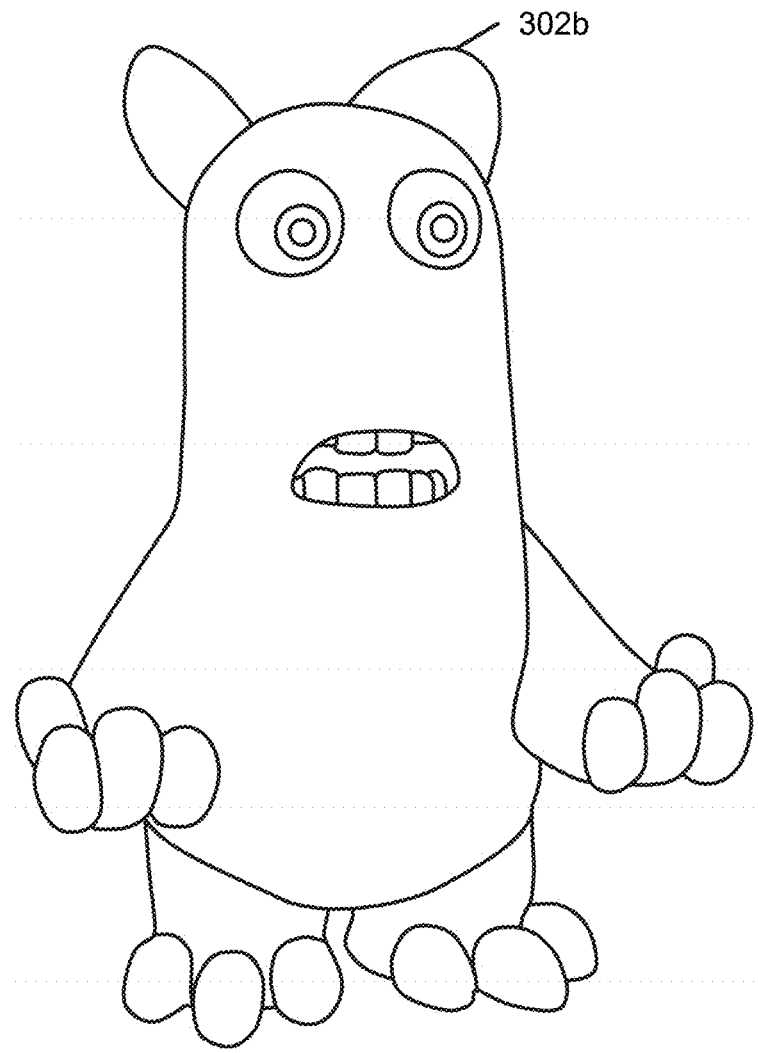
Figure 3C:
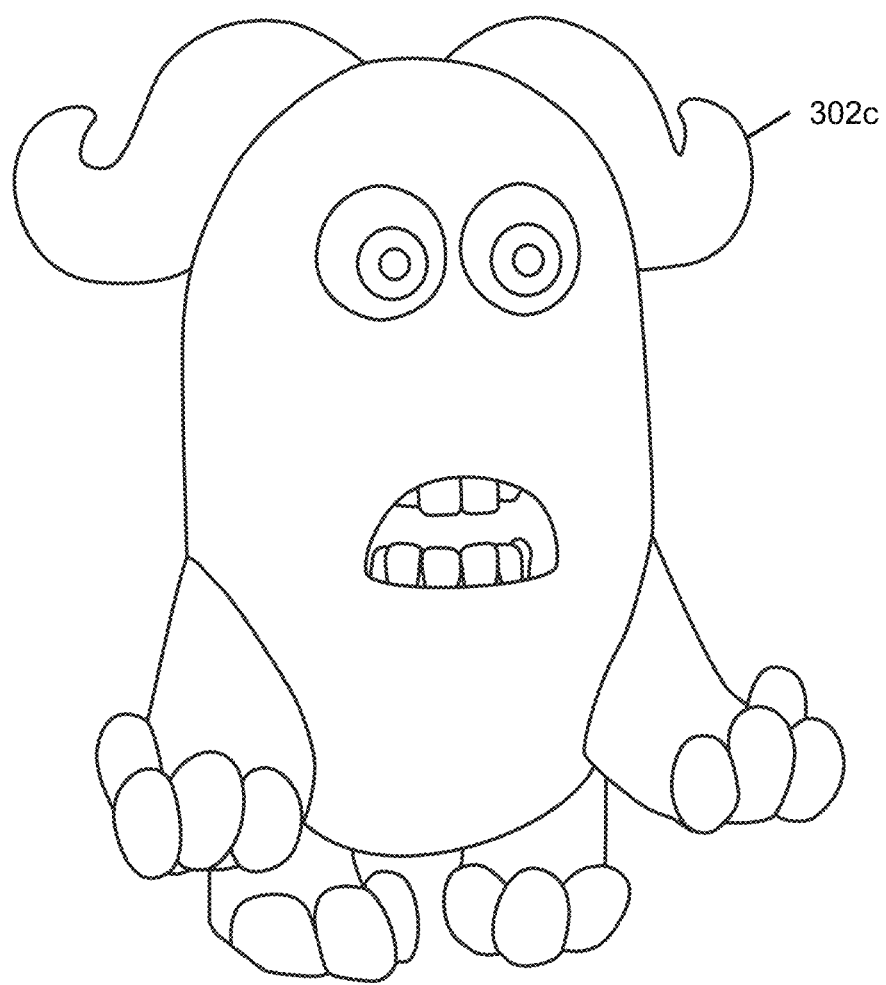
Figure 3D:
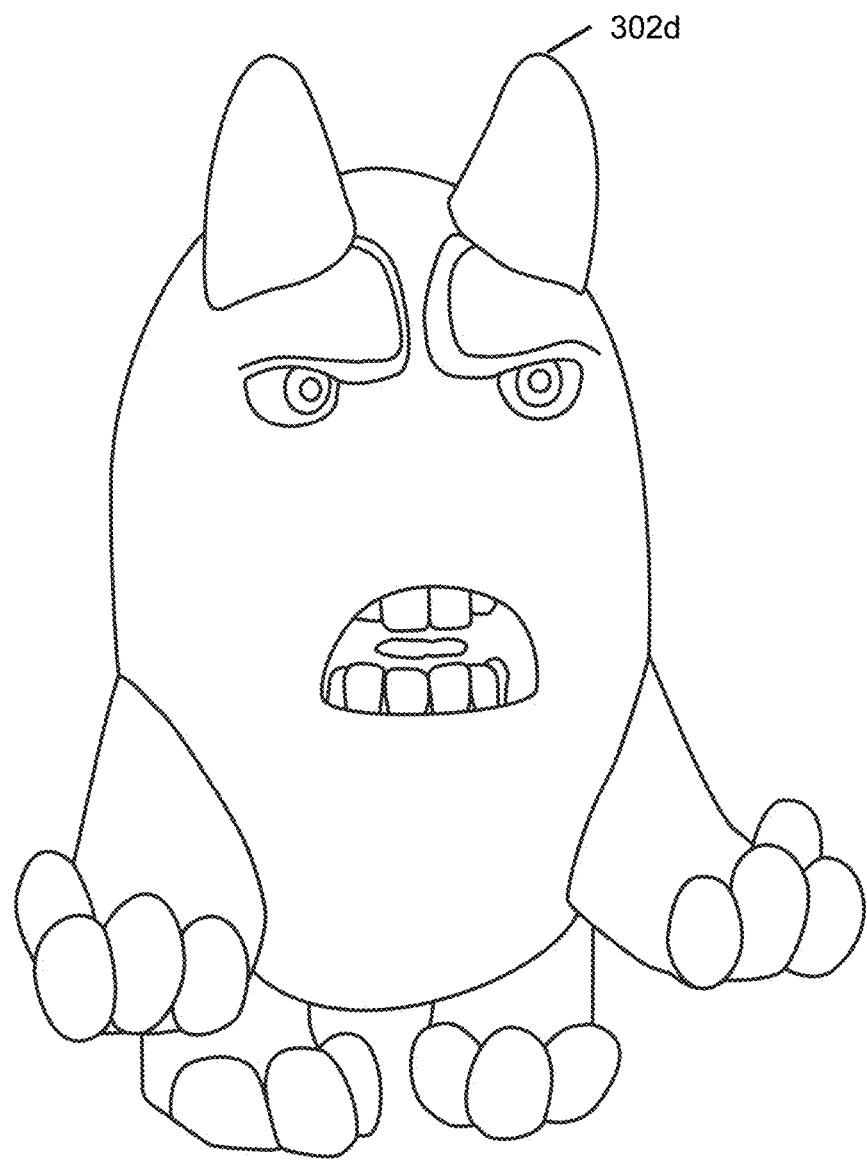
Figure 3E:
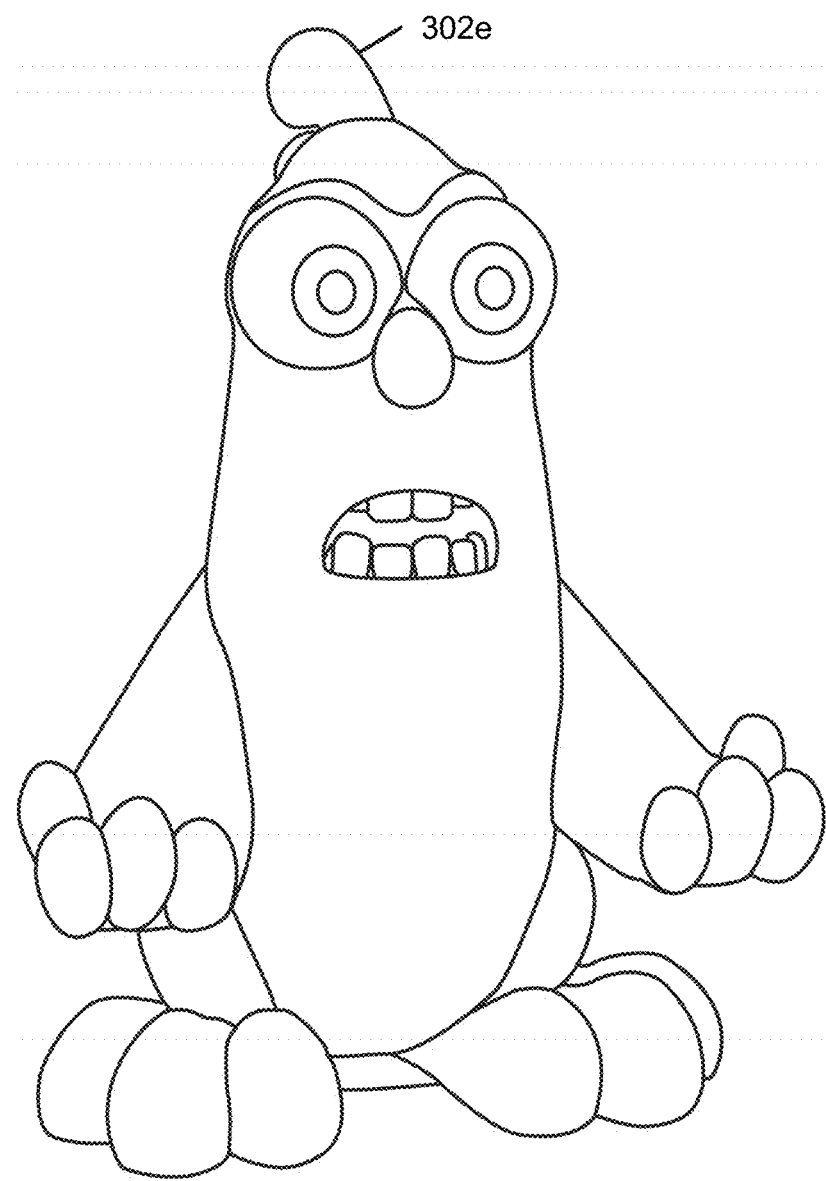

By way of example, FIGS. 2A-2F each provides exemplary illustrations of first and second items where a presentation of features at the first item can augment the second item, according to aspects of the invention. With respect to FIGS. 2A-2F, the second items may comprise devices 202a-202f, and the first items may comprise devices 204a-204f. At least some of the first and second items connect to one another via cables 206 (e.g., cable 206a, cable 206b, etc.). Each of the first items 204a-204f has a display screen on which a respective user interface 208 (e.g., user interface 208a-208f) is provided. Each of the second items has at least one component that holds the first items in place or component on which the first items may be placed (e.g., components 210 and 212). As shown, each of the second items 202 of FIGS. 2A-2E represents a character, while the second item 202f of FIG. 2F represents an object (e.g., a cola can).

FIGS. 3A-3E are each exemplary illustrations of an item (e.g., devices 302a-302e) that represents a character which features are presented at another item to augment the item representing the character, according to aspects of the invention.

Referring back to FIG. 1, system 100 may include one or more computers and subsystems to facilitate augmentation of a second item with a presentation of features at a first item. As shown in FIG. 1, system 100 may comprise user devices 102a-102n, server 104 (or servers 104), services 106a-106n, or other components. In one implementation, at least a first user device 102 of the user devices 102a-102n may comprise interaction subsystem 108, feature subsystem 110, presentation subsystem 112, reflection subsystem 114, or other components. At least a second user device 102 of the user devices 102a-102n may represent a character (or a place or an object) which features are presented at the first user device 102 to augment the second user device 102.

User device 102 may comprise any type of mobile terminal, fixed terminal, or other device. By way of example, user device 102 may comprise a desktop computer, a notebook computer, a netbook computer, a tablet computer, a smartphone, a navigation device, an electronic book device, a gaming device, or other user device. Users may, for instance, utilize one or more user devices 102 to interact with server 104, one or more other user devices 102, one or more services 106, or other components of system 100. By way of another example, one or more user devices 102 may be accessories to one or more other user devices 102.

It should be noted that while one or more operations are described herein as being performed by components of at least one of the user devices 102 (e.g., user device 102a), those operations may, in some implementations, be performed by components of server 104. In addition, while one or more operations are described herein as being performed by components of server 104, those operations may, in some implementations, be performed by components of at least one of the user devices 102 (e.g., user device 102a). For example, server interaction subsystem 116 may perform one or more operations described herein as being performed by interaction subsystem 108 (and vice versa). Server feature subsystem 118 may perform one or more operations described herein as being performed by feature subsystem 110 (and vice versa). Server presentation subsystem 120 may perform one or more operations described herein as being by presentation subsystem 112 (and vice versa). Server reflection subsystem 122 may perform one or more operations described herein as being performed by reflection subsystem 114 (and vice versa).

In certain implementations, for example, server interaction subsystem may detect a connection between a first item (at which a presentation of features of a character is provided) and a second item (that represents the character and comprises physical components that resemble a set of features of the character). Server feature subsystem 118 may obtain information associated with the character. Server presentation subsystem 120 may provide a presentation of the features of the character to the first item such that the presentation of the features of the character is provided at the first item. Server reflection subsystem 122 may modify the presentation of the features of the character in the same or similar manners as the presentation modifications described herein with respect to reflection subsystem 114.

In some implementations, the various computers and subsystems illustrated in FIG. 1 may comprise one or more computing devices that are programmed to perform the functions described herein. The computing devices may include one or more electronic storages (e.g., electronic storage 124 or other electric storages), one or more physical processors programmed with one or more computer program instructions, and/or other components. The computing devices may include communication lines, or ports to enable the exchange of information with a network or other computing platforms. The computing devices may include a plurality of hardware, software, and/or firmware components operating together to provide the functionality attributed herein to the servers. For example, the computing devices may be implemented by a cloud of computing platforms operating together as the computing devices.

The electronic storages may comprise non-transitory storage media that electronically stores information. The electronic storage media of the electronic storages may include one or both of system storage that is provided integrally (e.g., substantially non-removable) with the servers or removable storage that is removably connectable to the servers via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information received from the servers, information received from client computing platforms, or other information that enables the servers to function as described herein.

The processors may be programmed to provide information processing capabilities in the servers. As such, the processors may include one or more of a digital processor, an analog processor, a digital circuit designed to process information, an analog circuit designed to process information, a state machine, and/or other mechanisms for electronically processing information. In some implementations, the processors may include a plurality of processing units. These processing units may be physically located within the same device, or the processors may represent processing functionality of a plurality of devices operating in coordination. The processors may be programmed to execute computer program instructions to perform functions described herein of subsystems 108, 110, 112, 114, 116, 118, 120, 122, or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 108, 110, 112, 114, 116, 118, 120, or 122 described herein is for illustrative purposes, and is not intended to be limiting, as any of subsystems 108, 110, 112, 114, 116, 118, 120, or 122 may provide more or less functionality than is described. For example, one or more of subsystems 108, 110, 112, 114, 116, 118, 120, or 122 may be eliminated, and some or all of its functionality may be provided by other ones of subsystems 108, 110, 112, 114, 116, 118, 120, or 122. As another example, additional subsystems may be programmed to perform some or all of the functionality attributed herein to one of subsystems 108, 110, 112, 114, 116, 118, 120, or 122.

A more detailed description of various implementations for facilitating augmentation of a second item with a presentation of features at a first item is provided below. It should be noted that features described herein may be implemented separately or in combination with one another.

Even though in some implementations a second item that represents a character is augmented with a presentation of features of the character at a first item, aspects described in such implementations may be applicable to other implementations where an item that represents a place or an object is augmented with a presentation of features of the place or the object at another item. Such aspects may comprise (but are not limited to) modification of a presentation of features of a character based on: (i) information regarding a presentation of a media item simultaneously provided during the presentation of the features of the character; (ii) information regarding an utterance spoken by a user during the presentation of the features of the character; (iii) information regarding an action performed by a user during the presentation of the features of the character; (iv) information identifying a current date and/or a current time, (v) information identifying environmental conditions, or (vi) other information.

In one implementation, interaction subsystem 108 may be programmed to detect a connection between a first item and a second item. As an example, the detected connection may comprise a wired connection, wireless connection, a power connection (e.g., wired or wireless power), a data connection, or other connection. In one use case, the connection may be detected when the first item and the second item are physically connected to one another. In another use case, the connection may be detected when the first item and the second item are proximately close to one another (e.g., Bluetooth data connection, NFC data connection, wireless charging, etc.). In yet another use case, the connection may be a power connection between the first item and the second item, and the power connection may be detected in response to one of the two items being powered/charged via the other item (e.g., wired or wirelessly powering/charging).

As shown in FIG. 2A, device 202a represents a fictional monster and has physical components resembling a head, two eyes, arms, hands, a body, two legs, two feet, a mouth, teeth, and other features of the fictional monster. Device 204a can be a mobile device (e.g., a smartphone, a tablet, etc.) that may be connected to device 202a via a cable 206a. When the cable 206a is attached to both device 202a and device 204a, a data connection and/or a power connection may be detected (e.g., by device 202a, device 204a, or other device). As an example, when cable 206a is attached to both device 202a and device 204a, device 204a may detect a power connection between the two devices 202a and 204a in response to device 204a being charged/power via device 202a.

In one implementation, feature subsystem 110 may be programmed to obtain first information associated with the character (that is represented by the second item). Presentation subsystem 112 may be programmed to provide a presentation of one or more features of the character. The presentation of the features of the character may augment the second item. In certain implementations, the features of the character that are presented may comprise at least one feature of the set of features of the character that are represented by one or more physical components of the second item. In some implementations, the features of the character that are presented may comprise at least one of: (i) an additional feature of the character that is not represented by the physical components of the second item; or (ii) an alternative feature of the character to a feature of the set of features of the character that are represented by the physical components of the second item.

In one implementation, the features of the character may comprise one or more anthropomorphic or anatomical features of the character (e.g., eyes, nose, lips, mouth, teeth, neck, chest, abdomen, shoulders, arms, legs, hands, feet, or other anatomical features). For example, based on the obtained first information associated with the character, a presentation of the anatomical features of the character may be provided. In some implementations, the anatomical features of the character may comprise one or more facial features. For example, based on the obtained first information associated with the character, a presentation of the facial features of the character may be provided.

In one implementation, the first information associated with the character may be obtained in response to the detection of the connection between the first item and the second item. In certain implementations, the first information may comprise an identifier associated with the character. The identifier may, for instance, be used to obtain information related to the features of the character to provide the presentation of the features of the character. In one scenario, the second item may store an identifier associated with the character in a memory of the second item. Upon detection of the connection between the first item and the second item, the first item may obtain an identifier associated with the character from the second item via a wired or wireless data connection (e.g., USB data connection, Bluetooth data connection, NFC data connection, etc.). The first item may then utilize the identifier associated with the character to obtain information identifying characteristics of the features of the character that are to be presented at the first item. As an example, the identifier associated with the character may be mapped to a set of characteristics of the features of the character stored in a memory of the first item, a database at a server (e.g., server 104), one or more third-party services (e.g., one or more of services 106a-106n), or other component of the system 100. As another example, if information identifying the characteristics of the features to be presented is already stored at a memory of the first item, the first item may obtain the information identifying the characteristics from the memory based on the obtained identifier. Otherwise, the first item may submit, to a server servicing the first item, the identifier along with a request for the information identifying the characteristics to obtain such information.

In another scenario, an identifier associated with the character (that is represented by the second item) may be printed on the second item (e.g., as a bar code, as a QR code, etc.), and the first item may obtained the identifier by scanning the printed identifier off of the second item. The first item may then utilize the identifier associated with the character to obtain information identifying characteristics of the features of the character that are to be presented at the first item.

In various implementations, the first information may comprise the information related to the features of the character. As an example, when the first item is brought within a close proximity to the second item, the first item may wirelessly obtain information identifying characteristics of the features of the character from the second item (e.g., Bluetooth data connection, NFC data connection, etc.). The first item may then utilize the information identifying the characteristics of the features of the character to provide the presentation of the features of the characters at the first item.

In one implementation, presentation subsystem 112 may be programmed to provide a presentation of a media item that is different than the presentation of the features of the character that is represented by the second item. As an example, the presentation of the media item may be provided at the first item during the presentation of the features of the character. Reflection subsystem 114 may be programmed to modify the presentation of the features of the character to reflect the presentation of the media item.

In one implementation, the presentation of the features of the character may be modified at multiple times to respectively reflect a portion of the media item that is presented at each of the multiple times. As an example, a first set of characteristics of the features of the character may be selected for presentation at a first time at which a first portion of the media item is presented based on a determination that the first set of characteristics correspond to the first portion of the media item. A second set of characteristics of the features of the character may be selected for presentation at a second time at which a second portion of the media item is presented based on a determination that the second set of characteristics correspond to the second portion of the media item, and so on. The media item may, for instance, comprise audio content, graphic content, video content, or other content.

In one use case, with respect to FIG. 2A, during playback of a song, the presentation of the mouth of the fictional monster in user interface 208a may be modified to reflect the music and the vocals of the song. As an example, the mouth that is presented in user interface 208a may be closed and may be moving to the sound of the music beats when no vocals are currently playing. As another example, the mouth may open and close accordingly to give the appearance that the monster is singing (or at least lip-syncing) the song. The shape of the mouth of the monster at a given time may, for instance, be modified to match a human mouth shape corresponding to a specific sound when the specific sound is played at the given time. The shape of the mouth of the monster may be modified to reflect pitch, tone, intonation, volume, or other characteristics.

In another use case, the media item may comprise an utterance of a user that is captured at the first item, the second item, or other items. The presentation of the features of the character (that is represented by the second item) may be modified at the first item at multiple times to respectively reflect a portion of the utterance that is presented at each of the multiple times. As an example, a first set of characteristics may be selected for presentation at a first time (at which a first portion of the utterance is presented) based on a determination that a first voice characteristic of the first set of characteristics corresponds to the first portion of the utterance. A second set of characteristics may be selected for presentation at a second time (at which a second first portion of the utterance is presented) based on a determination that a second voice characteristic of the second set of characteristics corresponds to the second portion of the utterance, and so on. The first voice characteristic may comprise a first pitch characteristic, a first tone characteristic, a first intonation characteristic, a first volume characteristic, or other voice characteristic. The second voice characteristic may comprise a second pitch characteristic, a second tone characteristic, a second intonation characteristic, a second volume characteristic, or other voice characteristic.

In some implementations, information identifying characteristics of a media item may be known and stored at one or more databases (e.g., a database associated with server 104, a database at one of the services 106a-106n, etc.). The mouth shapes (or other features) of the character may be determined based on the known characteristics of the media item and stored at one or more databases. As such, the mouth shapes (or other features) may be predetermined before the presentation of the media item begins. In this way, among other benefits, the processing power needed to modify the presentation of the features of the character to reflect the presentation of the media item may be reduced. In addition, the presentation of the features of the character may be better in-sync with the presentation of the media item.

In other implementations, at least some of the characteristics of the media item and/or the mouth shapes (or other features) of the character that are to be presented may be determined on-the-fly as the media item is presented. As an example, a portion of the media item may be processed before that portion of the media item is presented to determine the characteristics of the portion and its corresponding character features before the portion of the media item is presented. As such, the need for databases of the characteristics of media items and/or databases of mouth shapes (or other features) of characters may be reduced.

In one implementation, interaction subsystem 108 may be programmed to detect an utterance of a user. A first portion of the utterance may be detected at a first time, and a second portion of the utterance may be detected at a second time. Reflection subsystem 114 may be programmed to modify the presentation of the features of the character (that is represented by the second item) to reflect the utterance. As indicated, in some implementations, the presentation of the features of the character may be modified at the first item at multiple times to respectively reflect a portion of the utterance that is presented at each of the multiple times. As indicated in the foregoing and following examples, such modifications to reflect utterances (or presentation of media items) may provide users with entertainment in a number of ways.

In one scenario, with respect to FIG. 2A, the presentation of the mouth of the fictional monster presented in user interface 208a may give the appearance that the monster is mimicking a user of the mobile device 204a as the user is speaking. The shape of the mouth of the monster at a given time may, for instance, be modified to match a human mouth shape corresponding to a specific portion of the utterance that is spoken by the user at the given time. The shape of the mouth of the monster may be modified to reflect pitch, tone, intonation, volume, or other characteristics. The modification may, for instance, be based on sensor information captured via sensors (e.g., cameras, microphones, or other sensors) at the first item, the second item, or other items.

In another scenario, with respect to FIG. 2A, the user of the mobile device 204a may be having a phone conversation (or other voice-enabled conversation) with a second user such that the speech of the second user may be outputted through the mobile device 204a to the user of the mobile device 204a. The presentation of the mouth of the fictional monster presented in user interface 208a may be modified at the first item at multiple times to respectively reflect a portion of the second user's speech outputted at each of the multiple times. As such, the presentation of the mouth of the monster may give the appearance that the monster is having a conversation with the user of the mobile device 204a (when, in fact, the monster is lip-syncing the second user's speech as the corresponding sounds are outputted via the mobile device 204a).

In one implementation, interaction subsystem 108 may be programmed to detect an action of a user. Reflection subsystem 114 may be programmed to modify the presentation of the features of the character such that the presentation of the features of the character gives an appearance of the character reacting to the action of the user. In this way, the combination of the first item and the second item may bring the character to life by providing the appearance that the character is "real," which will provide further amusement for consumers.

As an example, if a user performs a hand wave gesture at the first item (at which the presentation of the features of the character is provided) or the second item (that represents the character), the presentation of the features of the character may be modified such that a mouth of the character moves to lip-sync the word "hello" and/or speaks the word "hello." Such hand gestures may, for instance, be captured by one or more sensors (e.g., camera) and processed to determine the meaning of the hand gesture.

As another example, a user may perform a hand gesture corresponding to feeding the character. As such, the presentation of the character's mouth and surrounding facial areas may be modified such that the mouth and surrounding facial areas move to mimic eating.

In some implementations, the modification may cause the presentation of the features of the character to give: (i) an appearance that the action of the user physically affected the character; (ii) an appearance that the action of the user mentally affected the character; (iii) an appearance that the action of the user emotionally affected the character; or (iv) other appearance of the character reacting to the action of the user.

In one use case, with respect to FIG. 2A, if a user touches the screen at a point over the user interface 208a that corresponds to a given portion of the monster's cheeks, the presentation of the given portion of the monster's cheek may be modified to cause the given portion of the monster's cheeks to be temporarily (or permanently) dented, giving the appearance that the user's touch physically affected the monster. In a further use case, the depth of the dent in the given portion of the monster's cheek may be based on how hard the user pressed on the screen at the point corresponding to the given portion of the monster's cheeks (e.g., a shallow dent is caused when the user's touch is a soft touch, a deep dent is caused when the user's dent is a hard touch, etc.). The intensity of the touch may, for instance, be detected via touch-related sensors of the mobile device 204a.

In another use case, with respect to FIG. 2A, if a user flicks the screen (or performs a quick hard tap) on the screen at a point over the user interface 208a that corresponds to one of the monster's teeth, the presentation of the month's tooth may be modified to cause the monster's tooth to be temporarily (or permanently) loose or broken, giving the appearance that the user's touch physically affected the monster.

In another use case, if a user blows at the first item (e.g., a mobile device at which a presentation of features of a character) or at the second item (that represents the character), the presentation of the character's eyes may be modified to cause the character's eyes to be blinking or closed to give the appearance that the rushing air from the user is causing the character to blink or close its eyes, giving the appearance that the rushing air physically affected the character. Other characteristics of the character also may be affected by the appearance of rushing air, such as hair moving or ears twitching.

In another use case, if a user blows at the first item (e.g., a mobile device at which a presentation of features of a character) or at the second item (that represents the character), the presentation of the character may be modified to cause the character to cover its nose (e.g., if the character's arms are presented at the first item) to give the appearance that the character is reacting to the user's "bad breath" (and, thus, that the blowing air is having a physical effect on the character).

In another use case, if a user screams at the first item (e.g., a mobile device at which a presentation of features of a character) or at the second item (that represents the character), the presentation of the character may be modified to cause the character to cry or otherwise look sad to give the appearance that the user's screaming has an emotional effect on the character. In a further use case, if the user talks softly at the first item or the second item in a calm soothing voice, the presentation of the character may be modified to cause the character to stop crying or stop looking sad.

In another use case, if a user "hits" (or causes a physical impact greater than an associated predetermined threshold on) the second item at a position of the second item corresponding to the head of the character represented by the second item, the presentation of the character's face may be modified to cause the character to appear dizzy (after which the portion of the character presented in the user interface of the first item may also be temporarily unresponsive), giving the appearance that the user's attack on the second item has a mental effect on the character.

In one implementation, reflection subsystem 114 may be programmed to determine a current date and/or a current time. Reflection subsystem 114 may further be programmed to modify the presentation of the features of the character to reflect the current date and/or the current time.

In some implementations, the modification may cause the presentation of the one or more features of the character to give: (i) an appearance that the current date and/or the current time has a physical effect on the character; (ii) an appearance that the current date and/or the current time has a mental effect on the character; (iii) an appearance that the current date and/or the current time has an emotional effect on the character; or (iv) or other appearance indicating that the current date and/or the current time has an effect on the character.

In one scenario, the presentation of the character's face may look alert during the middle of the day, but may be modified such that the character's face may appear increasingly tired when night approaches and wears on, giving the appearance that the current time has a physical effect on the character.

In another scenario, the presentation of the character's face, body, or other features may change depending on the month of the year and/or the season. As an example, the character's face and body may appear to grow increasingly round around November and December (e.g., due to the Thanksgiving and Winter Holidays). On the other hand, the character's face and body may become increasingly tone toward the late spring in preparation for the summer. As such, the presentation of the character's features may be modified to give an appearance that the current date has a physical effect on the character.

In another scenario, if a user of the item representing the character has not purchased a virtual gift for the character on certain dates (e.g., the "birthday" of the character, Valentine's Day, etc.), the presentation of the character's face may be modified on those certain dates to give an appearance that character is upset and, thus, that the date and the failure of the user to purchase a gift have an emotional effect on the character.

In one implementation, reflection subsystem 114 may be programmed to determine environmental information, such as the current location, the current weather, the current pollen index, the current temperature, the current amount of noise surrounding the first item (at which presentation of character features is provided) or the second item that represents the character, or other environmental information. Reflection subsystem 114 may further be programmed to modify the presentation of the features of the character to reflect the environmental information.

In some implementations, the modification may cause the presentation of the one or more features of the character to give an appearance that the current location, the current weather, the current pollen index, the current temperature, the current amount of noise, or other environmental factor has an effect on the character (e.g., a physical effect, a mental effect, an emotional effect, or other effect).

In one implementation, server feature subsystem 118 may be programmed to receive, from the first item, a request for information related to the features of the character (that is represented by the second item). As an example, the request for the information related to the features of the character may be received from the first item in response to a detection of a connection between the first item and the second item. Server feature subsystem 118 may also be programmed to obtain the information related to the character. Server feature subsystem 118 may further be programmed to provide, to the first item, the information related to the character to enable a presentation of the one or more features of the character at the first item. As an example, the second item may comprise one or more physical components that resemble a set of features of the character. As such, the presentation of the features of the character at the first item may augment the second item.

In another implementation, server feature subsystem 118 may be programmed to receive, from the first item, a request for the presentation of the features of the character (that is represented by the second item). In some implementations, the request for the presentation of the features may comprise an identifier associated with the character, an identifier associated with the second item, or other information. The identifier associated with the character and/or the identifier associated with the second item may be utilized to generate the appropriate presentation of the features of the character for the first item. As an example, the identifier(s) may be mapped to a set of features and/or characteristics of the features that are suitable for presentation at the first item and augmentation of the second item. In particular, in some scenarios, multiple second items may represent the same character, but may still be different with respect to their appearance as well as the size, location, and/or orientation of those items' respective holders for the first item (e.g., horizontal placement, vertical placement, left placement, center placement, right placement, different size holders for different size phones, etc.). Nevertheless, because the identifier(s) are mapped to respective features of the character and/or characteristics of the features that are suitable for presentation at the first item and augmentation of the respective second item, an appropriate presentation of the features of the character may be generated.

Upon generation, server presentation subsystem 118 may provide, to the first item, the presentation of the features of the character such that the presentation of the features of the character is provided at the first item. As an example, the presentation of the features of the character may be streamed in real-time to the first item so that the first item can display the real-time streaming presentation of the features of the character.

Exemplary Flowcharts

FIGS. 4-10 comprise exemplary illustrations of flowcharts of processing operations of methods that enable the various features and functionality of the system as described in detail above. The processing operations of each method presented below are intended to be illustrative and non-limiting. In some implementations, for example, the methods may be accomplished with one or more additional operations not described, and/or without one or more of the operations discussed. Additionally, the order in which the processing operations of the methods are illustrated and described below is not intended to be limiting.

In some implementations, the methods may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the methods in response to instructions stored electronically on an electronic storage medium. The one or more processing devices may include one or more devices configured through hardware, firmware, and/or software to be specifically designed for execution of one or more of the operations of the methods.

Figure 4:
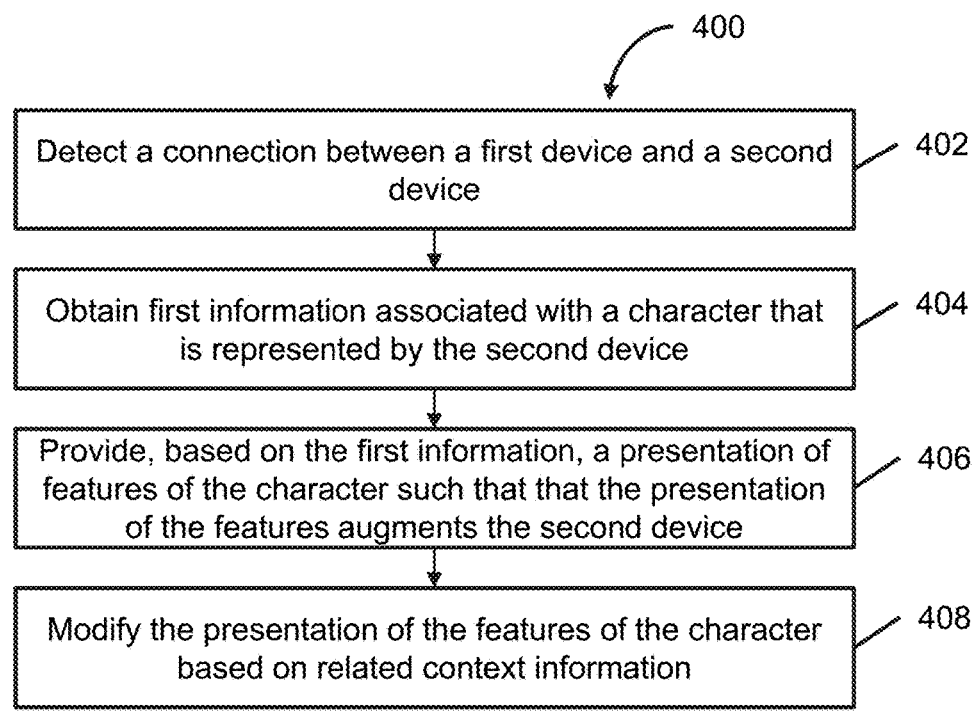
FIG. 4 is an exemplary illustration of a flowchart of a method of facilitating augmentation of a second item with a presentation of a second item with a presentation of features at a first item, according to an aspect of the invention.

FIG. 4 is an exemplary illustration of a flowchart of a method 400 of facilitating augmentation of a second item with a presentation of features at a first item, according to an aspect of the invention.

In an operation 402, a connection between a first item and a second item may be detected. As discussed, in one implementation, the first item may comprise a mobile device (e.g., comprising modules 108, 110, 112, and 114) and the second item may comprise a device having one or more physical components that represent a set of features of a character. The connection may comprise a wired connection, wireless connection, a power connection (e.g., wired or wireless power), a data connection, or other connection. Operation 402 may be performed by an interaction subsystem that is the same as or similar to interaction subsystem 108, in accordance with one or more implementations.

In an operation 404, first information associated with the character (that is represented by the second item) may be obtained. As an example, the first information associated with the character may be obtained in response to the detection of the connection between the first item and the second item. In one implementation, the first information may comprise an identifier associated with the character. The identifier may, for instance, be used to obtain information related to features of the character to provide a presentation of the features of the character. In another implementation, the first information may comprise the information related to the features of the character. Operation 404 may be performed by a feature subsystem that is the same as or similar to feature subsystem 110, in accordance with one or more implementations.

In an operation 406, the presentation of the features of the character may be provided based on the first information. As discussed, in one implementation, the first information may comprise an identifier associated with the character that is used to obtain information related to features of the character, and the presentation of the features of the character may be provided based on the information related to the features of the character. In another implementation, the first information may comprise the information related to the features of the character. Operation 406 may be performed by a presentation subsystem that is the same as or similar to presentation subsystem 110, in accordance with one or more implementations.

In an operation 408, the presentation of the features of the character may be modified. For example, the presentation of the features of the character may be modified based on related context information. The related context information may, for instance, comprise information regarding a presentation of a media item simultaneously provided during the presentation of the features of the character, information regarding an utterance spoken by a user during the presentation of the features of the character, information regarding an action performed by a user during the presentation of the features of the character, information identifying a current date and/or a current time, or other information. Operation 408 may be performed by a reflection subsystem that is the same as or similar to reflection subsystem 114, in accordance with one or more implementations.

Figure 5:
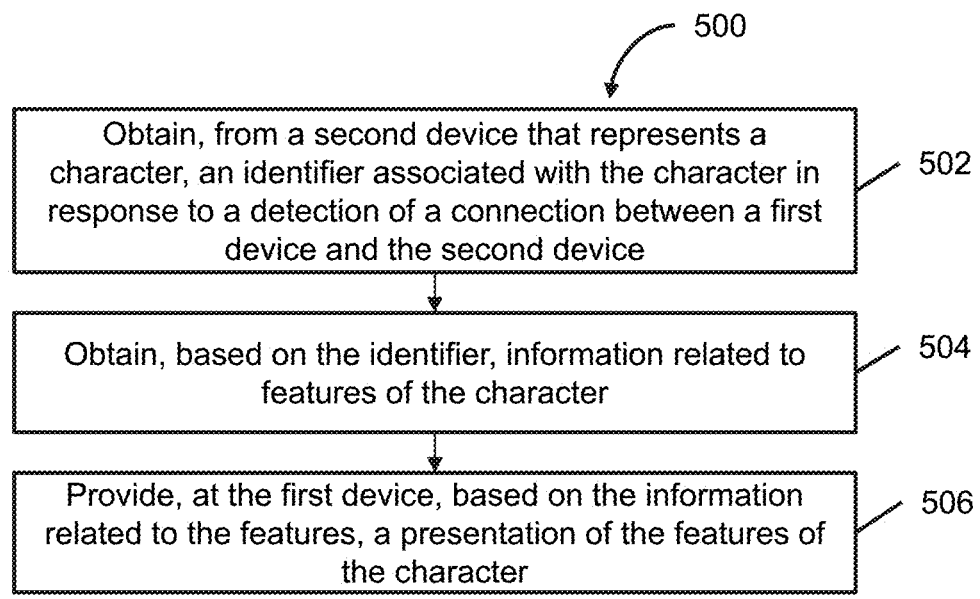
FIG. 5 is an exemplary illustration of a flowchart of a method of obtaining information features of a item-represented character to provide a presentation of the features of the character, according to an aspect of the invention.

FIG. 5 is an exemplary illustration of a flowchart of a method 500 of obtaining information features of an item-represented character to provide a presentation of the features of the character, according to an aspect of the invention.

In an operation 502, an identifier associated with a character (that is represented by a second item) may be obtained from the second item in response to a detection of a connection between a first item and the second item. In one implementation, the identifier may comprise a unique identifier corresponding to the character. In another implementation, the identifier may comprise a unique device identifier associated with the second item and the character represented by the second item. In some implementations, the second item may be pre-programmed with the identifier prior to sale of the second item to identify the second item as corresponding to the character associated with the identifier. Operation 502 may be performed by a feature subsystem that is the same as or similar to feature subsystem 110, in accordance with one or more implementations.

In an operation 504, information related to the features of the character may be obtained based on the identifier associated with the character. Operation 504 may be performed by a feature subsystem that is the same as or similar to feature subsystem 110, in accordance with one or more implementations.

In an operation 506, the presentation of the features of the character may be provided at the first item based on the information related to the features of the character. Operation 506 may be performed by a presentation subsystem that is the same as or similar to presentation subsystem 112, in accordance with one or more implementations.

Figure 6:
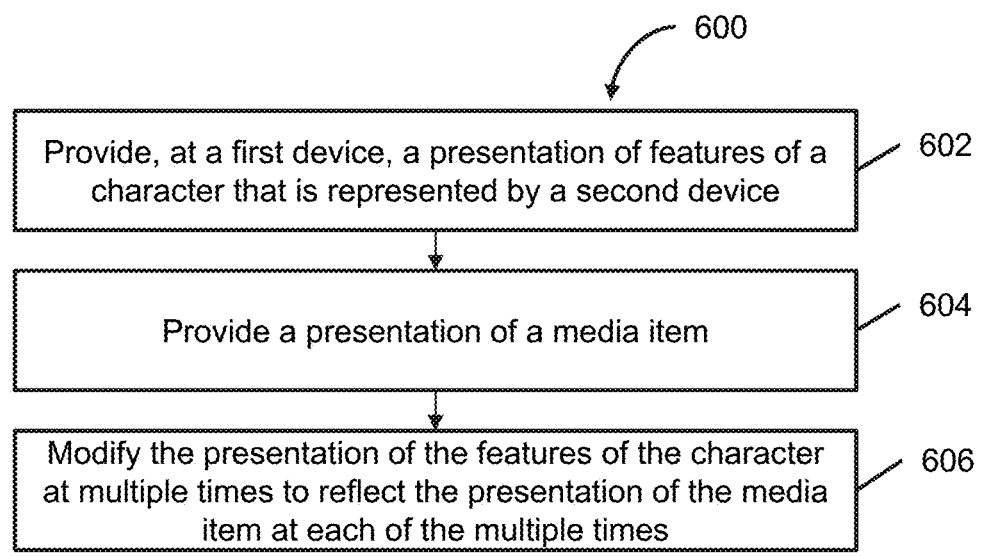
FIG. 6 is an exemplary illustration of a flowchart of a method of modifying a presentation of features of an item-represented character at multiple times to reflect a presentation of a media item at each of the multiple times, according to an aspect of the invention.

FIG. 6 is an exemplary illustration of a flowchart of a method 600 of modifying a presentation of features of an item-represented character at multiple times to reflect a presentation of a media item at each of the multiple times, according to an aspect of the invention.

In an operation 602, a presentation of features of a character (that is represented by a second item) may be provided at a first item. As an example, the presentation of the features of the character may be provided at the first item in response to a detection of a connection between the first item and the second item. Operation 602 may be performed by a presentation subsystem that is the same as or similar to presentation subsystem 112, in accordance with one or more implementations.

In an operation 604, a presentation of a media item (that is different than the presentation of the features of the character) may be provided. The presentation of the media item may, for instance, be provided at the first item, the second item, or other item. Operation 604 may be performed by a presentation subsystem that is the same as or similar to presentation subsystem 112, in accordance with one or more implementations.

In an operation 606, the presentation of the features of the character may be modified at multiple times to reflect the presentation of the media item at each of the multiple times. In one implementation, the presentation of the features of the character may be modified such that: (i) a presentation of a first set of characteristics of the features of the character may be provided at a first time during the presentation of the media item; and (ii) a presentation of a second set of characteristics of the features of the character may be provided at a second time during the presentation of the media item. As an example, the first set of characteristics may be obtained for presentation at the first time based on information related to a first portion of the media item that corresponds to the first time. The second set of characteristics may be obtained for presentation at the second time based on information related to the second portion of the media item that corresponds to the second time. Operation 606 may be performed by a reflection subsystem that is the same as or similar to reflection subsystem 114, in accordance with one or more implementations.

Figure 7:
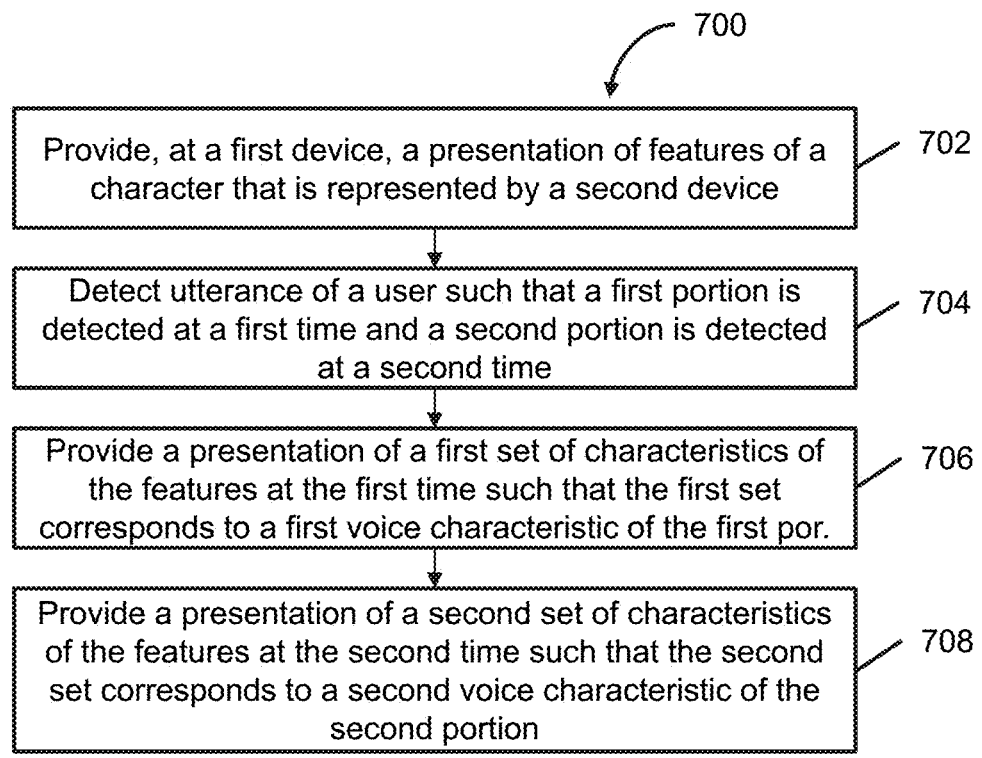
FIG. 7 is an exemplary illustration of a flowchart of a method of modifying a presentation of features of an item-represented character to reflect portions of an utterance at times that respectively correspond to each of the detected portions, according to an aspect of the invention.

FIG. 7 is an exemplary illustration of a flowchart of a method 700 of modifying a presentation of features of an item-represented character to reflect portions of an utterance at times that respectively correspond to each of the detected portions, according to an aspect of the invention.

In an operation 702, a presentation of features of a character (that is represented by a second item) may be provided at a first item. As an example, the presentation of the features of the character may be provided at the first item in response to a detection of a connection between the first item and the second item. Operation 702 may be performed by a presentation subsystem that is the same as or similar to presentation subsystem 112, in accordance with one or more implementations.

In an operation 704, an utterance of a user may be detected. A first portion of the utterance may be detected at a first time, and a second portion of the utterance may be detected at a second time. Operation 704 may be performed by an interaction subsystem that is the same as or similar to interaction subsystem 108, in accordance with one or more implementations.

In an operation 706, a presentation of a first set of characteristics of the features of the character may be provided at the first time (at which the first portion of the utterance is detected). The first set of characteristics may, for example, correspond to a first voice characteristic of the first portion of the utterance (e.g., a pitch characteristic, a tone characteristic, an intonation characteristic, a volume characteristic, or other voice characteristic). Operation 706 may be performed by a reflection subsystem that is the same as or similar to reflection subsystem 114, in accordance with one or more implementations.

In an operation 708, a presentation of a second set of characteristics of the features of the character may be provided at the second time (at which the second portion of the utterance is detected). The second set of characteristics may, for example, correspond to a second voice characteristic of the second portion of the utterance. Operation 708 may be performed by a reflection subsystem that is the same as or similar to reflection subsystem 114, in accordance with one or more implementations.

Figure 8:
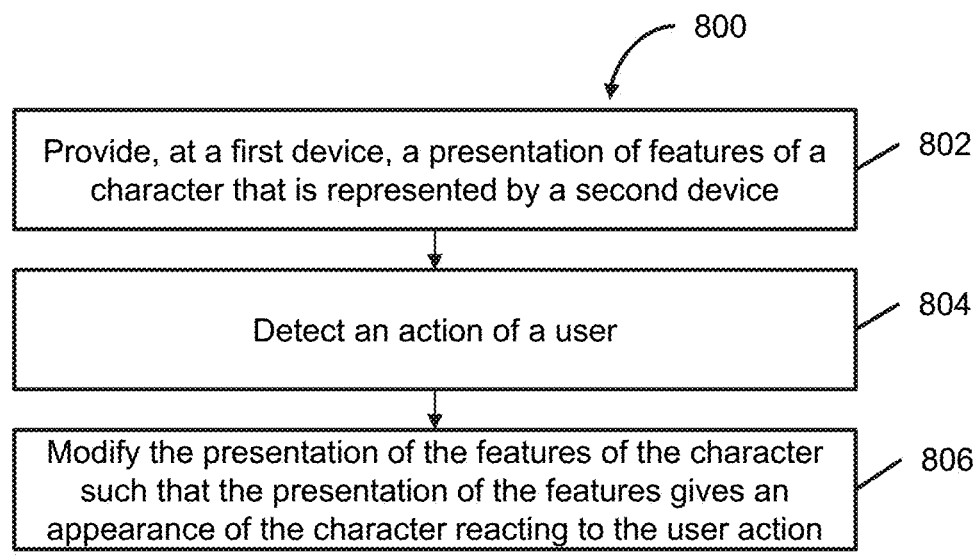
FIG. 8 is an exemplary illustration of a flowchart of a method of modifying a presentation of features of an item-represented character to give an appearance of the character reacting to a user action, according to an aspect of the invention.

FIG. 8 is an exemplary illustration of a flowchart of a method 800 of modifying a presentation of features of an item-represented character to give an appearance of the character reacting to a user action, according to an aspect of the invention.

In an operation 802, a presentation of features of a character (that is represented by a second item) may be provided at a first item. As an example, the presentation of the features of the character may be provided at the first item in response to a detection of a connection between the first item and the second item. Operation 802 may be performed by a presentation subsystem that is the same as or similar to presentation subsystem 112, in accordance with one or more implementations.

In an operation 804, an action of a user may be detected. Operation 804 may be performed by an interaction subsystem that is the same as or similar to interaction subsystem 108, in accordance with one or more implementations.

In an operation 806, the presentation of the features of the character may be modified such that the presentation of the features of the character gives an appearance of the character reacting to the action of the user. As an example, upon modification to give an appearance of the character reacting to the action of the user, the presentation of the features of the character may give: (i) an appearance that the action of the user physically affected the character; (ii) an appearance that the action of the user mentally affected the character; (iii) an appearance that the action of the user emotionally affected the character; or (iv) other appearance of the character reacting to the action of the user. Operation 806 may be performed by a reflection subsystem that is the same as or similar to reflection subsystem 114, in accordance with one or more implementations.

Figure 9:
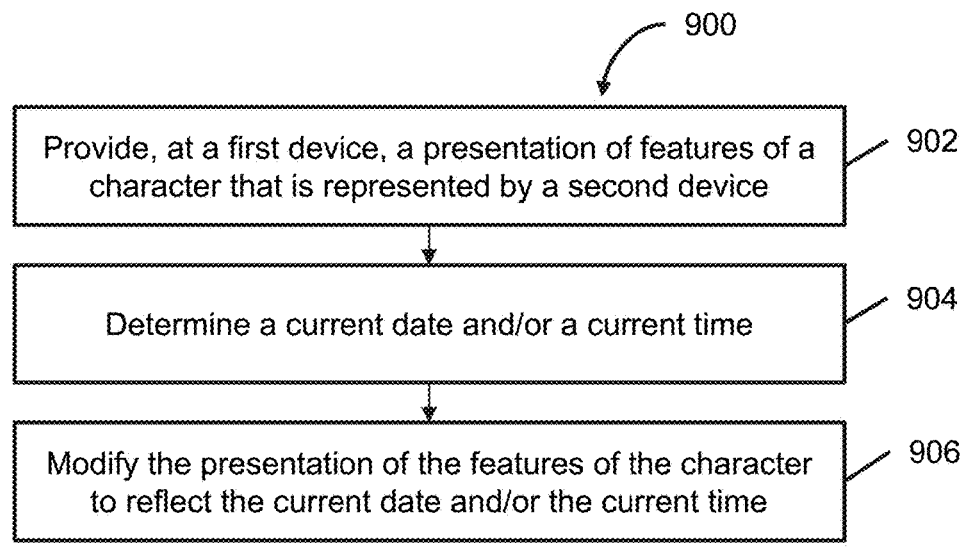
FIG. 9 is an exemplary illustration of a flowchart of a method of modifying a presentation of features of an item-represented character to reflect the current date and/or the current time, according to an aspect of the invention.

FIG. 9 is an exemplary illustration of a flowchart of a method 900 of modifying a presentation of features of an item-represented character to reflect the current date and/or the current time, according to an aspect of the invention.

In an operation 902, a presentation of features of a character (that is represented by a second item) may be provided at a first item. As an example, the presentation of the features of the character may be provided at the first item in response to a detection of a connection between the first item and the second item. Operation 902 may be performed by a presentation subsystem that is the same as or similar to presentation subsystem 112, in accordance with one or more implementations.

In an operation 904, a current date and/or a current time may be determined. Operation 904 may be performed by a reflection subsystem that is the same as or similar to reflection subsystem 114, in accordance with one or more implementations.

In an operation 906, the presentation of the features of the character may be modified to reflect the current date and/or the current time. As an example, the presentation of the features of the character may be modified such that the presentation of the features of the character gives: (i) an appearance that the current date and/or the current time has a physical effect on the character; (ii) an appearance that the current date and/or the current time has a mental effect on the character; (iii) an appearance that the current date and/or the current time has an emotional effect on the character. Operation 906 may be performed by a reflection subsystem that is the same as or similar to reflection subsystem 114, in accordance with one or more implementations.

Figure 10:
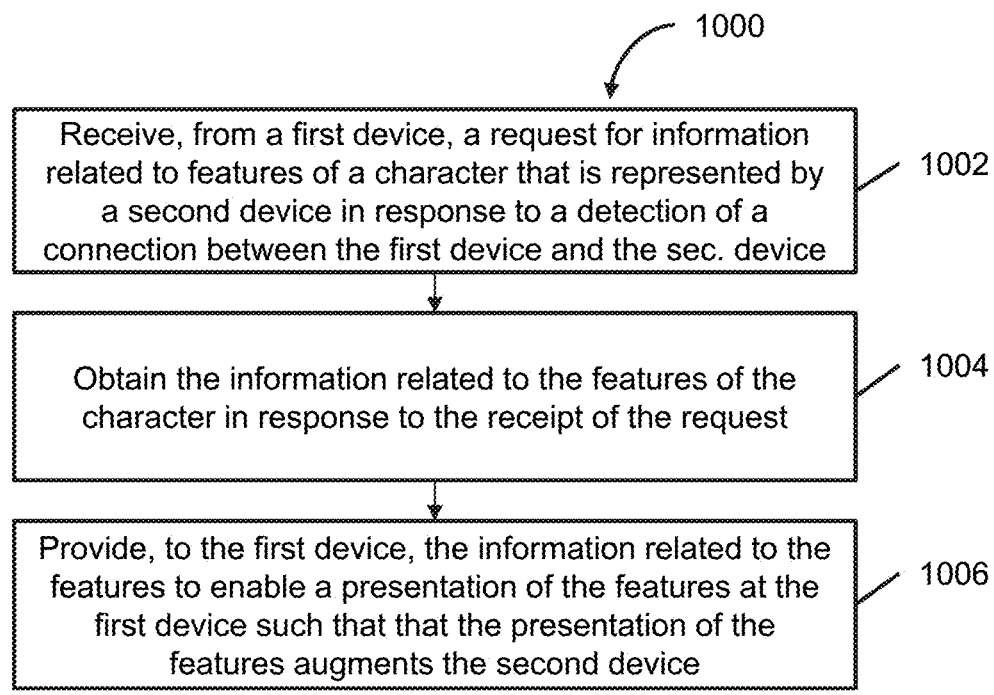
FIG. 10 is an exemplary illustration of a flowchart of a method of providing, to a first item, information related to features of a character that is represented by a second item to enable the first item to augment the second item, according to an aspect of the invention.

FIG. 10 is an exemplary illustration of a flowchart of a method 1000 of providing, to a first item, information related to features of a character that is represented by a second item to enable the first item to augment the second item, according to an aspect of the invention.

In an operation 1002, a request for information related to one or more features of a character may be received from a first item. As an example, the character may be represented by a second item. The request for the information related to the features of the character may be received from the first item in response to a detection of a connection between the first item and the second item. Operation 1002 may be performed by a server feature subsystem that is the same as or similar to server feature subsystem 118, in accordance with one or more implementations.

In an operation 1004, the information related to the features of the character may be obtained in response to the receipt of the request. Operation 1004 may be performed by a server feature subsystem that is the same as or similar to server feature subsystem 118, in accordance with one or more implementations.

In an operation 1006, the information related to the features of the character may be provided to the first item to enable a presentation of the features of the character at the first item. As an example, the second item may comprise one or more physical components that represent a set of features of the characters. As such, the presentation of the features of the character may augment the second item. Operation 1006 may be performed by a server feature subsystem that is the same as or similar to server feature subsystem 118, in accordance with one or more implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A first item for providing, at the first item, features of a character to augment the character, the first item comprising:
one or more physical processors programmed with one or more computer program instructions which, when executed, cause the one or more physical processors to:
detect a connection between the first item and the character, wherein the character includes a body having one or more physical features, the connection between the first item and the character including a power connection between the first item and the character, with the power connection being detected in response to the first item being powered or charged via the character;
obtain first information associated with the character in response to the detection of the power connection; and
provide, at the first item, based on the first information, a presentation of one or more augmented features of the character, wherein the presentation of the one or more augmented features of the character augments the character, and wherein the presentation of the one or more augmented features of the character augments at least one aspect of the one or more physical features of the character;
wherein the character includes a mounting component that extends away from the body of the character, the mounting component configured to externally hold the first item in place relative to the character;
wherein the first information includes a unique identifier associated with the character, the character pre-programmed with the unique identifier; and
wherein the one or more physical processors are further caused to:
obtain second information associated with the character based on the unique identifier, the second information including information related to the one or more physical features, wherein presenting the one or more augmented features includes presenting, at the first item, the one or more augmented features based on the second information.

2. The first item of claim 1, wherein the one or more augmented features of the character further comprises at least one of: (i) an additional feature of the character that is not represented by the one or more physical features of the character; or (ii) an alternative feature of the character to a feature of the one or more physical features of the character.

3. The first item of claim 1, wherein the one or more physical processors are further caused to:
provide, at the first item, a presentation of a media item that is different than the presentation of the one or more augmented features of the character; and
modify the presentation of the one or more augmented features of the character to reflect the presentation of the media item.

4. The first item of claim 3, wherein modifying the presentation of the one or more augmented features comprises:
modify the presentation of the one or more augmented features of the character at multiple times to reflect the presentation of the media item at each of the multiple times such that:
(i) at a first time during the presentation of the media item, the presentation of the one or more augmented features of the character includes a presentation of a first set of characteristics of the one or more augmented features of the character; and
(ii) at a second time during the presentation of the media item, the presentation of the one or more augmented features of the character includes a second set of characteristics of the one or more augmented features of the character, wherein the second set of characteristics is different than the first set of characteristics.

5. The first item of claim 4, wherein the one or more physical processors are further caused to:
capture, at the first item, an utterance of a user, wherein the media item includes the utterance;
wherein providing the presentation of the media item includes providing, at the first item, a playback of the utterance, and
wherein modifying the presentation of the one or more augmented features of the character includes:
providing, at the first item, the presentation of the first set of characteristics at the first time such that at least one characteristic of the first set of characteristics corresponds to a first voice characteristic of a first portion of the utterance that is played back at the first time; and providing, at the first item, the presentation of the second set of characteristics at the second time such that at least one characteristic of the second set of characteristics corresponds to a second voice characteristic of a second portion of the utterance that is played back at the second time.

6. The first item of claim 5, wherein the first voice characteristic comprises at least one of a first pitch characteristic, a first tone characteristic, a first intonation characteristic, or a first volume characteristic, and wherein the second voice characteristic comprises at least one of a second pitch characteristic, a second tone characteristic, a second intonation characteristic, or a second volume characteristic.

7. The first item of claim 4, wherein the media item comprises at least one of audio content, graphic content, or video content.

8. The first item of claim 1, wherein the one or more physical processors are further caused to:
detect an utterance of a user, wherein a first portion of the utterance is detected at a first time, and a second portion of the utterance is detected at a second time; and
modify the presentation of the one or more augmented features of the character to reflect the utterance of the user, wherein modifying the presentation of the one or more augmented features of the character comprises:
providing, at the first item, a presentation of a first set of characteristics of the one or more augmented features of the character at the first time such that at least one characteristic of the first set of characteristics corresponds to a first voice characteristic of the first portion of the utterance that is detected at the first time; and
providing, at the first item, a presentation of a second set of characteristics of the one or more augmented features of the character at the second time such that at least one characteristic of the second set of characteristics corresponds to a second voice characteristic of the second portion of the utterance that is detected at the second time.

9. The first item of claim 1, wherein the one or more physical processors are further caused to:
detect an action of a user; and
modify the presentation of the one or more augmented features of the character such that the presentation of the one or more augmented features of the character gives an appearance of the character reacting to the action of the user.

10. The first item of claim 9, wherein modifying the presentation of the one or more augmented features of the character gives at least one of: (i) an appearance that the action of the user physically affected the character; (ii) an appearance that the action of the user mentally affected the character; or (iii) an appearance that the action of the user emotionally affected the character.

11. The first item of claim 10, wherein the presentation of the one or more augmented features of the character gives the appearance that the action of the user physically affected the character.

12. The first item of claim 10, wherein the presentation of the one or more augmented features of the character gives the appearance that the action of the user emotionally affected the character.

13. The first item of claim 1, wherein the one or more physical processors are further caused to:
determine at least one of a current date or a current time; and
modify the presentation of the one or more augmented features of the character to reflect at least one of the current date or the current time.

14. The first item of claim 13, wherein modifying the presentation of the one or more augmented features of the character gives at least one of: (i) an appearance that at least one of the current date or the current time has a physical effect on the character; (ii) an appearance that at least one of the current date or the current time has a mental effect on the character; or (iii) an appearance that at least one of the current date or the current time has an emotional effect on the character.

15. The first item of claim 1, wherein the one or more physical features include one or more anatomical features, and wherein providing the presentation of the one or more augmented features includes providing, at the first item, a presentation of one or more augmented anatomical features based on the first information.

16. The first item of claim 15, wherein the one or more anatomical features include one or more facial features, and wherein providing the presentation of the one or more augmented anatomical features includes providing, at the first item, a presentation of one or more augmented facial features based on the first information.

17. The first item of claim 16, wherein the first information includes song information; and
wherein during playback of the song at the first item, a presentation of a mouth of the character at the first item is modified to reflect music beats and vocals of the song, with the mouth presented at the first item closed and moving to sounds of the music beats of the song when no vocals are playing in the song.

18. A method of providing, at a first item, features of a character to augment the character, the method being implemented by a computer system that includes one or more physical processors executing one or more computer program instructions which, when executed, perform the method, the method comprising:
detecting, by the computer system, a connection between the first item and the character, wherein the character includes a body having one or more physical features, the connection between the first item and the character including a power connection between the first item and the character, with the power connection being detected in response to the first item being powered or charged via the character;
obtaining, by the computer system, first information associated with the character in response to the detection of the power connection; and
providing, by the computer system, based on the first information, a presentation of one or more augmented features of the character at the first item, wherein the presentation of the one or more augmented features of the character augments the character, and wherein the presentation of the one or more augmented features of the character augments at least one aspect of the one or more physical features of the character;
wherein the character includes a mounting component that extends away from the body of the character, the mounting component configured to externally hold the first item in place relative to the character;

wherein the first information includes a unique identifier associated with the character, the character pre-programmed with the unique identifier; and wherein the method further includes:

obtaining, by the computer system, second information associated with the character based on the unique identifier, the second information including information related to the one or more physical features, wherein presenting the one or more augmented features includes presenting, at the first item, the one or more augmented features based on the second information.

19. A system for providing, at a first item, features of a character to augment the character, the system comprising:

one or more physical processors programmed with one or more computer program instructions which, when executed, cause the one or more physical processors to:

receive, from a first item, a request for information related to one or more physical features of a body of the character in response to a detection of a connection between the first item and the character, the connection between the first item and the character including a power connection between the first item and the character, with the power connection being detected in response to the first item being powered or charged via the character;

obtain the information related to the physical features of the character in response to the receipt of the request; and provide, to the first item, the information related to the physical features of the character to enable a presentation of one or more augmented features of the character at the first item, wherein the presentation of the one or more augmented features of the character augments the character, and wherein the presentation of the one or more augmented features of the character augments at least one aspect of the one or more physical features of the character;

wherein the character includes a mounting component that extends away from the body of the character, the mounting component configured to externally hold the first item in place relative to the character;

wherein the first information includes a unique identifier associated with the character, the character pre-programmed with the unique identifier; and wherein the one or more physical processors are further caused to:

obtain second information associated with the character based on the unique identifier, the second information including information related to the one or more physical features, wherein presenting the one or more augmented features includes presenting, at the first item, the one or more augmented features based on the second information.

* * * * *